Patented Dec. 19, 1950

2,534,484

UNITED STATES PATENT OFFICE 2,534,484

AMBROSIA

John I. Thompson, Bay Head, N. J., and Robert Flowers, Thomasville, Ga., assignors to Mitchell Canneries, Inc., Thomasville, Ga., a corporation of Florida No Drawing. Application May 5, 1947, Serial No. 746,162

11 Claims. (Cl. 99—125)

This invention relates to the canning of a combination of orange and shredded cocoanut, commonly known as ambrosia.

The combination of sliced orange or orange segments with shredded cocoanut has long been a popular dessert. According to known recipes, fresh orange slices or segments are combined with other fruit ingredients, such as grapefruit, pineapple or bananas, and sugar if desired. Over this combination of fruits is placed a layer of cocoanut which may either be fresh shredded cocoanut or moist packed shredded cocoanut. While this fresh fruit dessert has been known for many years, attempts to produce it in a canned form have heretofore uniformly met with failure. In the first place, it is difficult to can orange slices or segments by themselves due to the presence of hesperidin, a glucoside which precipitates during storage giving the appearance of mold and harming the taste of the fruit. When cocoanut, either in its fresh or shredded moist packed form, is added to the can, both the cocoanut and orange pieces break down and form a heterogeneous pulpy mass in an oily liquid. As the product is usually served chilled, the fatty particles from the cocoanut congeal to form an unsightly and unnaturally tasting mixture.

It is an object of this invention to can a fatty food with a non-fatty food in such a way that the can may be heat sterilized without melting or otherwise leaching out the fat or oils from the fatty food.

Other objects of this invention are to produce a canned product consisting essentially of citrus fruit and shredded cocoanut in which the fruit retains a fresh and natural appearance, the liquid remains with the clarity of fruit juices taken from fruit so prepared, and the cocoanut maintains a white, long fiber appearance and is not glued to the fruit but remains as free shreds in a manner such as would occur if sprinkled upon a bowl of fresh fruit. A further object is to produce canned orange segments which do not become unpalatable during storage.

In general, these objects are obtained by treating a fatty food such as cocoanut shreds so that the oil in the shreds is prevented from leaching out during subsequent canning operations, packing the cocoanut shreds in a can along with the fruit of, or fixed to, a minimum acid value, and then heating the can within such time and temperature limits to effect sterilization without breaking down the previously stabilized cocoanut shreds or releasing the oil therefrom.

Fresh oranges and grapefruit are peeled, segmented and placed in a can containing sugar syrup to the sweetness desired. Crushed canned pineapple is added for flavor, and the acidity of the ingredients adjusted to come within a pH range of from 3.5 to 4.0, if such does not already exist. It has been discovered that the acidity of the fruit mixture is critical in the effect of the sterilization upon the cocoanut shreds and that the natural fruit may give acid values beyond the critical range. Adjustment is made with sodium carbonate or citric acid as the case may require.

Shredded cocoanut, whether fresh, desiccated or frozen, is treated to seal the oil in the individual shreds. Although shredded cocoanut as commercially available has been preserved either by being sprayed with glycerine or glycols or impregnated with sugar, a further treatment is necessary for the purposes of this invention in order to inhibit the escape of the fats and oils during the canning process. This is done either by boiling the cocoanut shreds with glycerine or a glycol such as propylene glycol which causes a hardening of the cocoanut oil on and just beneath the surface of the shreds, or by washing the shreds in a mild caustic solution to saponify the surface fats on the shreds, and then washing the shreds to remove the fat. Up to 15% of the original weight of the shreds is removed. The pores in the washed shreds are sealed by the sugar solution in which the shreds are immersed when placed in the can.

The cocoanut shreds are placed in the can with the fruit, the can sealed and sterilized to a center temperature of from about 168° F. to 173° F. and then cooled.

Canned ambrosia produced by this process is markedly different from that resulting from ordinary canning procedure. When untreated desiccated cocoanut, rehydrated cocoanut, shredded cocoanut previously preserved with a coating of glycerine or glycol, or fresh shredded cocoanut is added to a fruit mixture and canned, the cocoanut fibers become either soft and lifeless or disintegrate, the cocoanut fat escaping into the can to form unsightly fat particles giving an artificial taste to the fruit, especially when the fat is congealed upon chilling the product. Consequently, the further processing of the cocoanut shreds to inhibit the escape of the oil therefrom is an essential of this invention.

It has been discovered, however, that this processing of the cocoanut shreds is not in of itself sufficient to prevent the cocoanut shreds from breaking down and losing their oils during the canning operation. Normal sterilization temperatures for fruits and fruit juices run from 190° F. to 212° F. for 25 to 35 minutes. Center temperatures of about 185° F. are obtained. This heating is severe enough to overcome the stabilization of the cocoanut shreds with the result as if untreated cocoanut had been used. To reduce the time of heating, the pH value of the product is adjusted to between 3.5 and 4.0. The range is critical with respect to both time and flavor. Below a pH of 3.5, the fruit becomes unpalatable because of a sharp acid taste. Above a pH of 4.0, the heat of sterilization must be increased above the melting of the cocoanut fat point, and as the oil escapes from the cocoanut shreds, the shreds disintegrate and the fruit becomes soft and pulpy with an unappetizing bland taste.

The preferred forms of the invention are as follows:

Example 1

Oranges and grapefruit from the early season crop were peeled, sectioned and placed in cans. This fruit had a pH of 3.4 and, accordingly, sufficient sodium carbonate was added to bring the pH to 3.7. Crushed canned sweetened pineapple, syrup and shredded cocoanut were added to give the following proportions for can of No. 2 size:

| | Ounces |
|---|---|
| Orange segments | 12.40 |
| Grapefruit segments | 2.25 |
| Cocoanut (shredded and processed) | 0.70 |
| Crushed canned pineapple (sweetened) | 4.50 |
| Syrup—65° Brix | 0.87 |

The shredded cocoanut as received in bulk from a commercial source had been treated with propylene glycol as a preservative. The shredded cocoanut was given a 10-minute boil in a 1.0% solution of sodium hydroxide and washed with water to remove the saponified fats. About 10% of the original weight of the cocoanut was removed. This washed cocoanut was placed in the can with the other ingredients, the can sealed, and then sterilized in a hot water bath until the temperature in the center of the can reached 168° F. The can was then air cooled.

Example 2

Oranges and grapefruit were packed with crushed pineapple as in Example 1. The shredded cocoanut which had been treated with propylene glycol was boiled in a 0.25% glycerine solution, drained and packed in the can in the same proportion given in Example 1.

Example 3

Oranges and grapefruit from the mid-season crop were peeled, sectioned and found to have a pH of 3.7. As this fruit lay within the allowable pH range of from 3.5 to 4.0, no adjustment of its acidity was necessary. It was canned in the proportions and with the ingredients otherwise set forth in Example 1.

Example 4

Oranges and frapefruit from the late season crop were peeled, sectioned and found to have a pH of 4.2. The pH was adjusted to 3.7 by the addition of citric acid. Otherwise the process of canning followed that given in Example 1.

In the process set forth in Examples 3 and 4, the glycerine treated shredded cocoanut can be substituted for the cocoanut processed in the caustic soda solution, although the latter is preferred as it is less expensive. Other saponifying agents as the alkalies and metallic hydroxides, such as sodium carbonate or potassium hydroxide, may be substituted for the caustic soda. Likewise, the proportions of the ingredients may be varied according to taste, it being apparent that the orange and cocoanut flavors must be conspicuous in order to meet the definition of ambrosia.

The canned ambrosia produced by the above described process closely resembles the combination of assembled fresh fruits and shredded cocoanut. By making the processing of the fruit and cocoanut interdependent upon one another, the end result achieves the objects of the invention in that the fruit retains its form and flavor, the fruit juice in the can remains clear and uncontaminated by cocoanut oil, while the cocoanut shreds remain white and firm with a natural firmness, chewiness and cocoanut flavor.

There are several remarkable features in this invention, the reason for which is not understood at this time. Essentially a fatty food, the shredded cocoanut, is canned with a non-fatty food, the citrus fruit. For the first time, a fatty food has been inhibited from breaking down or melting when heat sterilized with a non-fatty food. Furthermore, the fatty food remains stabilized during storage despite the presence of the syrup in the can. While it is known that the acid range in the case of canning ambrosia is critical, yet the action of the acid upon the ingredients is not known. However, the process is applicable to the canning of other fruits and vegetables. Still again the orange segments do not break down into a pulp, which occurs when orange segments are canned by themselves. The canning of orange segments has not been commercially successful due to the precipitation of the hesperidin. The only known exception is the mandarin orange which is native to Japan. However, oranges of any species when canned in the ambrosia of this invention appear to become inhibited against the precipitation of the hesperidin, and the segments remain firm and of good flavor. There is at present no explanation for this result.

Having now described the means by which the objects of the invention are obtained, we claim:

1. The process of stabilizing shredded cocoanut when canned with citrus fruit and sugar syrup which comprises saponifying and removing the surface oil from the shreds, and replacing said surface oils with the sugar syrup in the can.

2. The process of canning orange and grapefruit segments with shredded cocoanut which comprises placing orange and grapefruit segments in a can, adjusting the acidity of said segments to a pH ranging from 3.5 to 4.0, removing at least the surface oil from the cocoanut shreds, the removed oil being less than 15% of the original weight of the shreds, placing said shreds in said can, and sterilizing said can until a center temperature ranging from 168° F. to 173° F. is reached.

3. The process of claim 2 which further comprises placing crushed cooked pineapple with said segments in said can.

4. The process for preparing shredded cocoanut shreds for canning which comprises saponifying about 10% by weight of the cocoanut shreds in the form of fat, and then washing said shreds to remove said saponified fats.

5. The process as in claim 4, in which said saponification comprises boiling said fibers in a 1.0% solution of caustic soda.

6. The process of canning citrus fruit segments with shredded cocoanut which comprises placing citrus fruit segments in a can, adjusting the acidity of said segments to a pH ranging from 3.5 to 4.0, removing at least the surface oil from the cocoanut shreds, the removed oil being less than 15% of the original weight of the shreds, placing said shreds in a can, and sterilizing said can until a center temperature ranging from 168° F. to 173° F. is reached.

7. The process of preparing shredded cocoanut meat comprising heating said cocoanut meat in a mild alkaline solution for a duration sufficient to establish a surface character for said meat to inhibit the escape of oil from said meat at food sterilizing temperatures while retaining a substantial quantity of oil in said meat.

8. The process of claim 7 in which said cocoanut is boiled for about 10 minutes in an approximate 1.0% solution of sodium hydroxide.

9. The process of canning citrus fruit and shredded cocoanut meat comprising saponifying and removing the surface oil from the cocoanut meat shreds, placing said shreds together with sugar syrup in a can and thereby replacing said surface oils with sugar syrup, adding citrus fruit having a pH ranging from 3.5 to 4.0 to said can, and sterilizing said can until a center temperature ranging from approximately 168° F. to 173° F. is reached.

10. A canned product comprising citrus fruit and oil bearing shredded cocoanut meat, the surfaces of said shreds being combined with sugar syrup to form an oil seal barrier at the surfaces of said shreds to prevent the leaching of oil therefrom, said product having a pH ranging from 3.5 to 4.0, and said shreds being produced by saponifying the surface oil on the shredded cocoanut meat and replacing said oil with said sugar syrup.

11. A canned product as in claim 10 in which said product is further produced by saponifying said shreds in a mild alkaline solution and then rinsing said shreds, and said product is sterilized until a center temperature of from approximately 168° F. to 173° F. is reached.

JOHN I. THOMPSON.
ROBERT FLOWERS.

REFERENCES CITED

The following references are of record in the file of this patent:

UNITED STATES PATENTS

| Number | Name | Date |
|---|---|---|
| 84,241 | Williams | Nov. 17, 1868 |
| 220,359 | Dunham | Oct. 7, 1879 |
| 2,338,184 | Kaufman | Jan. 4, 1944 |

OTHER REFERENCES

"The Boston Cook Book," by Fannie Farmer, 1945, page 60.